United States Patent [19]
Fujiwara et al.

[11] Patent Number: 5,448,448
[45] Date of Patent: Sep. 5, 1995

[54] ALUMINUM ELECTROLYTIC CAPACITOR DEVICE

[75] Inventors: Yoshichika Fujiwara, Tokyo; Toshinori Watabe, Tokorozawa; Hiroshi Uchida, Tokyo, all of Japan

[73] Assignee: Canon Kabushiki Kaisha, Tokyo, Japan

[21] Appl. No.: 894,291

[22] Filed: Jun. 4, 1992

[30] Foreign Application Priority Data

| Jun. 10, 1991 | [JP] | Japan | 3-137960 |
| Jun. 10, 1991 | [JP] | Japan | 3-137961 |
| Jun. 10, 1991 | [JP] | Japan | 3-137962 |

[51] Int. Cl.$^6$ ............................................. H01G 9/048
[52] U.S. Cl. .................................... 361/530; 29/25.03
[58] Field of Search .......................... 29/25.03, 25.42; 361/529, 530, 324, 272, 275, 323, 301.5, 273, 275.1, 511

[56] References Cited

U.S. PATENT DOCUMENTS

| 2,297,669 | 9/1942 | Robinson et al. | 361/530 |
| 2,887,634 | 5/1959 | Peck et al. | 361/323 |
| 3,596,147 | 7/1971 | Zeppieri | 361/530 |
| 3,663,876 | 5/1972 | McBride et al. | 318/221 D |
| 4,037,298 | 7/1977 | Flanagan et al. | 29/25.42 |
| 4,345,298 | 8/1982 | Grahame | 361/273 |
| 4,847,575 | 7/1989 | Ikeda | 361/313 X |

*Primary Examiner*—Bruce A. Reynolds
*Assistant Examiner*—Michael D. Switzer
*Attorney, Agent, or Firm*—Fitzpatrick, Cella, Harper & Scinto

[57] ABSTRACT

An aluminum electrolytic capacitor has a large cylindrical hole in a core portion thereof. The anode and cathode foils and electrolyte-containing papers are rolled with less tension for an initial predetermined number of turns than for the later turns. Instead of forming the hole large, a core portion is formed by rolling the electrolyte-containing papers and either the anode foil or the cathode foil, or neither of them.

5 Claims, 7 Drawing Sheets

OVERVOLTAGE IS APPLIED

OVERVOLTAGE IS APPLIED

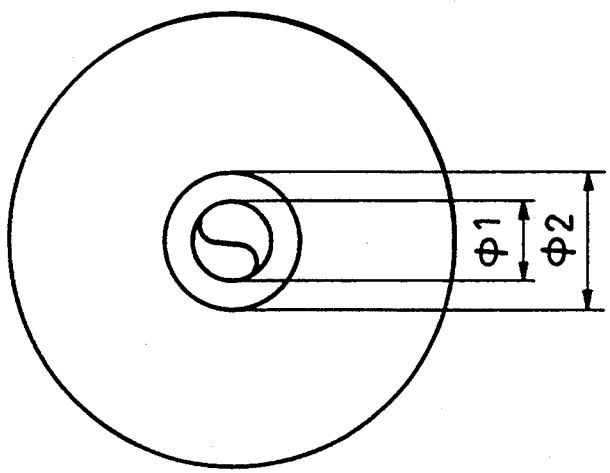
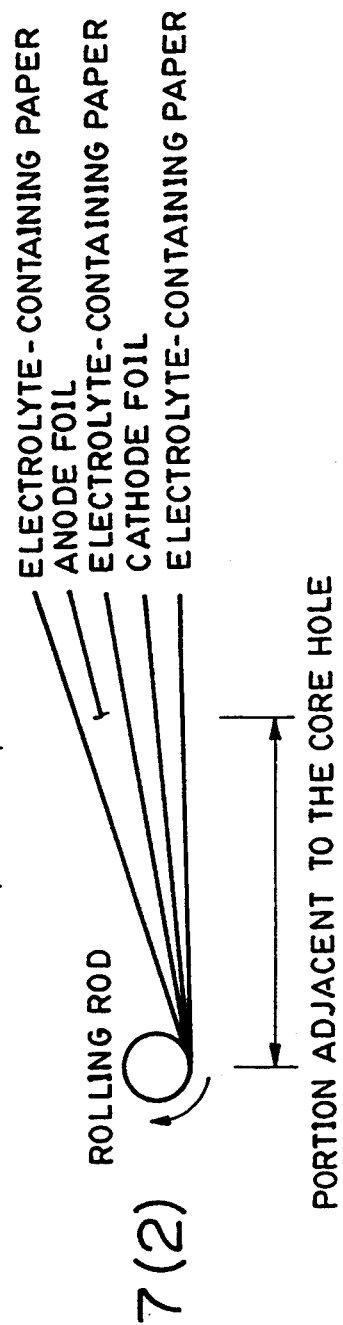
FIG. 7(1)
FIG. 7(2)

ALUMINUM ELECTROLYTIC CAPACITOR DEVICE

BACKGROUND OF THE INVENTION

1. Field of the Invention

The present invention relates to an aluminum electrolytic capacitor device, which is employed in a switching power circuit, etc.

2. Description of the Related Art

A conventional aluminum electrolytic capacitor is small in size but large in capacitance since its capacitance per unit area is significantly large. To meet the demand for down-sized electronic circuit component parts, the size of the aluminum electrolytic capacitor is further reduced and the capacitance thereof is further increased. As shown in FIG. 1, the diameter of a cylindrical hole of the core portion of a capacitor device is normally 3 to 6 mm.

If such an aluminum electrolytic capacitor is subjected to abnormal stress, such as overvoltage, formation current locally flows into a portion where an anode foil and a cathode foil are not parallel. Such formation current causes an exothermic reaction, which, in turn, causes the electrolyte to evaporate. As a result gas pressure increases, generating a force to expand the capacitor device both outward and inward. Since the outside of the device is fastened by a tape, the electrode foils in an outer portion are not substantially affected. However, the electrode foils close to the core cylindrical hole are buckled toward the core hole by the increased pressure, causing a short circuit between the electrodes. In some cases, a spark caused by the short circuit ignites the electrolyte, and the capacitor device burns.

SUMMARY OF THE INVENTION

The present invention is intended to solve the above problems of the conventional art. It is an object of the present invention to provide an aluminum electrolytic capacitor in which the core cylindrical hole is large and the anode and cathode foils and electrolyte-containing papers are rolled with low tension for the first several turns.

It is another object of the present invention to provide an aluminum electrolytic capacitor in which a portion of the roll close to the core cylindrical hole is formed by rolling the electrolyte-containing papers alone or with either the anode foil or the cathode foil.

It is still another object of the present invention to provide an aluminum electrolytic capacitor which can be used as a smoothing device in a switching power circuit.

The further objects, features and advantages of the present invention will become apparent in the below description of the preferred embodiments with reference to the attached drawings.

BRIEF DESCRIPTION OF THE DRAWINGS

FIG. 1(2) illustrates how an anode foil, a cathode foil and electrolyte-containing papers are rolled to form the conventional aluminum electrolytic capacitor shown in FIG. 1 (1).

FIGS. 7(1) and 7(2) illustrate a portion of the aluminum electrolytic capacitor shown in FIG. 6, including a portion with no electrode foil.

DESCRIPTION OF THE PREFERRED EMBODIMENTS

One embodiment of the present invention will be described below with reference to FIGS. 3 and 4.

Figure 1:
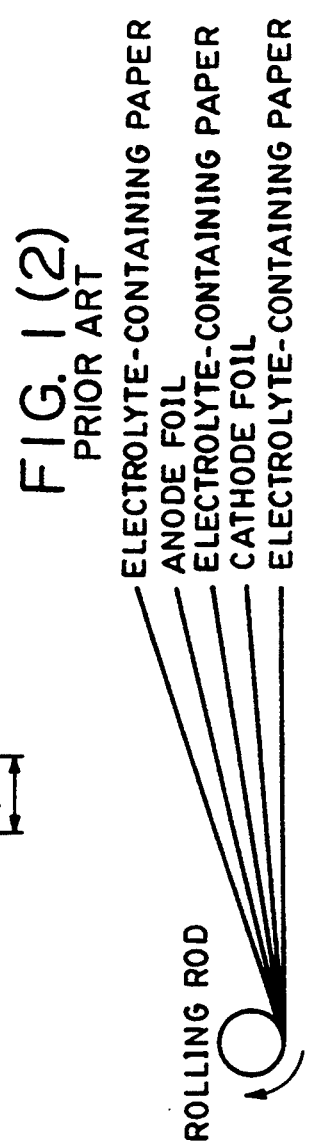
FIG. 1(1) illustrates a conventional aluminum electrolytic capacitor device, showing the diameter $\phi 1$ of a core cylindrical hole thereof.
Figure 2:
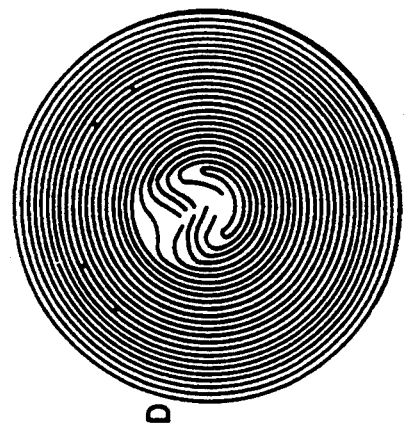
FIG. 2 illustrates internal states of the aluminum electrolytic capacitor shown in FIG. 1 before and after application of overvoltage.
Figure 2:
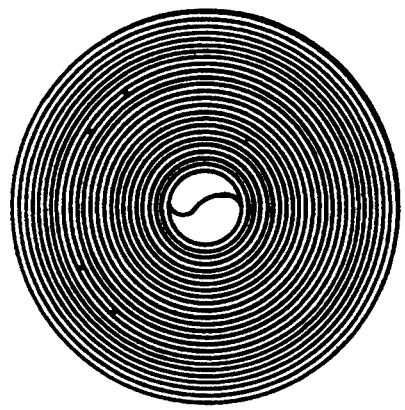
Figure 3:
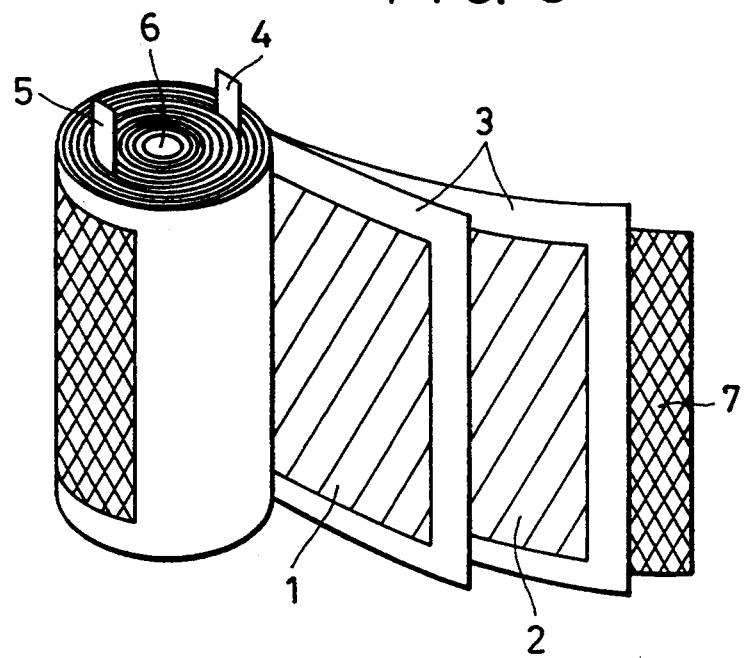
FIG. 3 is a perspective view of an aluminum electrolytic capacitor according to one embodiment of the present invention.

Referring to FIG. 3, an aluminum electrolytic capacitor device according to this embodiment comprises: an anode foil 1 and a cathode foil 2 separated by electrolyte-containing papers 3 which are rolled together to form a rolled capacitor device; a tape 7 provided around the outside periphery of the rolled capacitor device so as to fasten the rolled device; an anode lead terminal 4 and a cathode lead terminal 5 which are lead out from the anode and cathode foils 1 and 2, respectively. A core hole 6 is formed by removing a core rod around which the electrode foils 1, 2 and the papers 3 are rolled.

Figure 4:
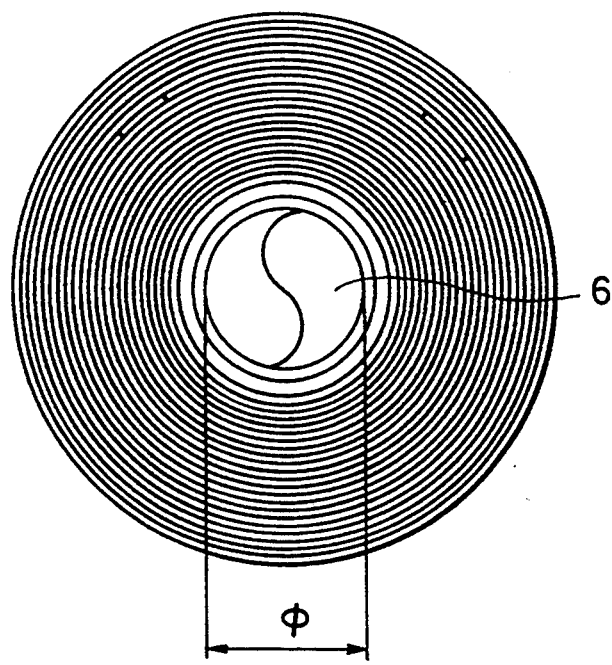
FIG. 4 is a top plan view of the aluminum electrolytic capacitor shown in FIG. 3.

FIG. 4 is a top plan view of the capacitor device shown in FIG. 3. The core hole has a diameter $\phi$, for example, of 7 mm, which is larger than that of a conventional aluminum electrolytic capacitor. The electrode foils 1, 2 and the papers 3 are rolled with lower tension for a predetermined number of turns from the beginning, for example, five turns.

Figure 5:
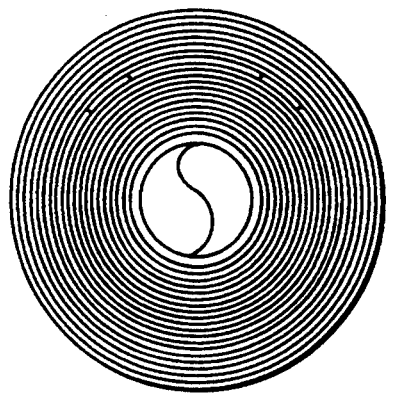
FIG. 5 illustrates internal states of the aluminum electrolytic capacitor shown in FIG. 3 before and after application of overvoltage.
Figure 5:
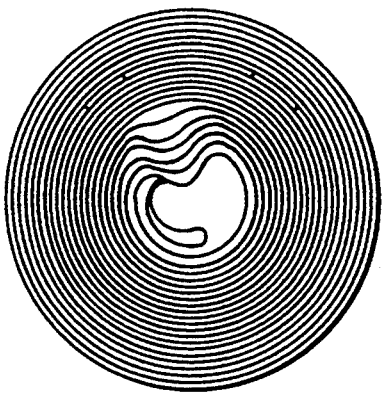

Since the core hole of the aluminum electrolytic capacitor has a larger diameter $\phi$ than the core hole of the conventional electrolytic capacitor, and since a portion adjacent to the core hole is formed by rolling the electrode foils and papers with lower tension than in the other portion, the incidence of buckling and a short circuiting is reduced. If the capacitor device is subjected to abnormal stress, such as overvoltage, the buckling stress caused on the electrode foils (the anode and cathode foils 1, 2) in the portion adjacent to the core hole is substantially reduced. The foils 1, 2 therein bend toward the core hole, as shown in FIG. 5, absorbing the force caused therein. Thus, buckling or a short circuit is unlikely to occur.

According to this embodiment of the present invention, since the diameter of the core hole is 7 mm or greater, and since a portion adjacent to the core hole is formed by rolling the electrode foils and papers with lower tension than in the other portion, the buckling force per unit area of the foils caused by abnormal stress, such as overvoltage, is substantially reduced; and the foils bend and wrinkle. Thus, the foils hardly ever buckle or break. The incidence of a short circuit between the electrodes and burning of the capacitor device is substantially reduced.

Another embodiment of the present invention will be described below with reference to FIGS. 6 to 8.

Figure 6:
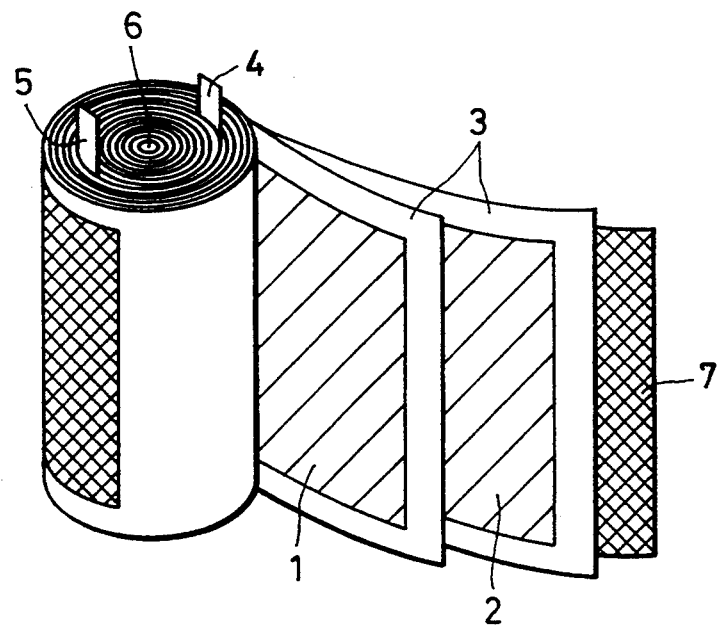
FIG. 6 is a perspective view of an aluminum electrolytic capacitor according to another embodiment of the present invention.

Referring to FIG. 6, an aluminum electrolytic capacitor device according to this embodiment comprises: an anode foil 1 and a cathode foil 2 separated by electrolyte-containing papers 3 which are rolled together to form a rolled capacitor device; a tape 7 provided around the outside periphery of the rolled capacitor device so as to fasten the rolled device; an anode lead terminal 4 and a cathode lead terminal 5 which lead out of the anode and cathode foils 1 and 2, respectively. A core hole 6 is formed by removing a core rod around which the electrode foils 1, 2 and the papers 3 are rolled.

While, according to the conventional art, the electrode foils 1, 2 and the electrolyte-containing papers 3 are rolled together from the beginning, according to this embodiment, a portion adjacent to the core hole 6 does not contain both of the electrode foils 1 and 2. For example, as shown in FIGS. 7(1) and 7(2), the papers 3 and the cathode foil 2 are rolled forming the core hole having a diameter $\phi 1$ (3 to 6 mm) the same as in the conventional art until a roll having a diameter $\phi 2$ is obtained. Then, the anode foil 1 is rolled together with the electrolyte-containing papers 3 and the cathode foil 2.

Since the portion adjacent to the core hole does not contain the anode foil 1, buckling of the anode foil 1 hardly occurs even if the capacitor device is subjected to abnormal stress, such as overvoltage. Thus, a short circuit between the electrodes and burning of the capacitor device are substantially unlikely to occur.

Figure 8:
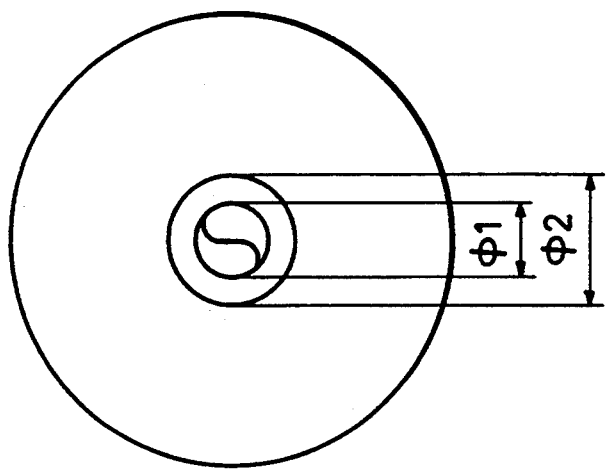
FIGS. 8(1) and 8(2) illustrate another example of the portion including no electrode foil.
Figure 8:
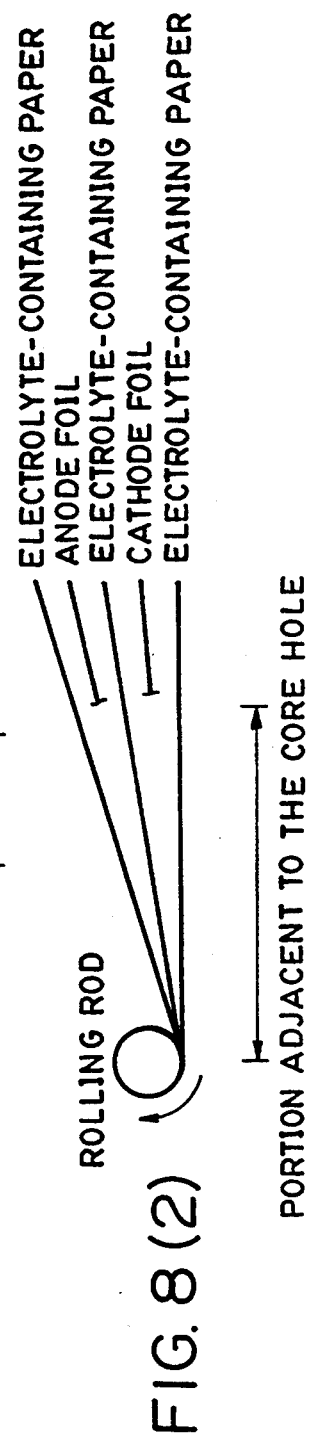

Alternatively, as shown in FIGS. 8(1) and 8(2), the rolled portion up to the diameter $\phi 2$ may be formed by solely using the electrolyte-containing papers 3. Then, the anode and cathode foils 1, 2 are rolled together with the electrolyte-containing papers 3. In addition, the electrode foils 1, 2 and the electrolyte-containing papers 3 may be rolled with reduced tension for a predetermined number of turns immediately outside the turn of the diameter $\phi 2$.

As described above, according to this embodiment, since a portion adjacent to the core hole does not contain both of the electrodes, the incidence of a short circuit and burning of the capacitor device caused by abnormal stress, such as overvoltage, is substantially reduced.

Figure 9:
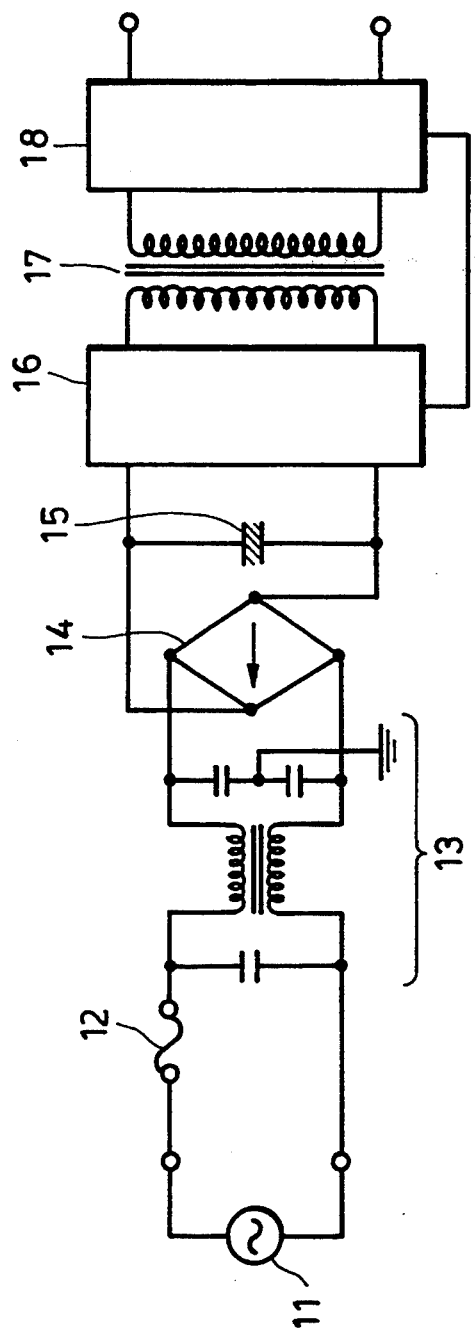
FIG. 9 illustrates a switching circuit employing an aluminum electrolytic capacitor as shown in FIG. 3 or 6.

FIG. 9 illustrates a switching power circuit connected to a single-phase three-wire input power source for office machines, such as a copying machine, a facsimile or a laser beam printer, which employs an aluminum electrolytic capacitor device as shown in FIG. 3 or 6.

The switching power circuit is connected to a single-phase three-wire input power source 11 and comprises a source-protecting means (a fuse) 12, a line filter circuit 13, a rectifier 14, an aluminum electrolytic capacitor device 15 according to the present invention, a switching control circuit 16, a power transformer 17 and a smoothing circuit 18 connected to a load circuit on the secondary side. The aluminum electrolytic capacitor device 15 smooths the output of the rectifier 14. The aluminum electrolytic capacitor device 15 can be thus used since it has a large capacitance.

Normally, DC voltage of 140 V is applied to an aluminum electrolytic capacitor device in a switching power circuit. If the neutral conductor of the single-phase three-wire input power source breaks, overvoltage $2\frac{1}{2}$ to 2 times as high as the above-mentioned voltage level is applied to the aluminum electrolytic capacitor device. Even if such a high voltage is applied, the aluminum electrolytic capacitor device according to the present invention hardly ignites.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. An aluminum electrolytic capacitor device comprising:
   an anode foil:
   a cathode foil;
   an electrolyte-containing paper provided between said anode foil and said cathode foil; and
   a rolled device cylindrically formed by rolling said anode foil, said cathode foil and said electrolytic-containing paper, said rolled device having a cylindrical hole formed in a core portion thereof and being formed by rolling said anode foil, said cathode foil and said electrolytic-containing paper with less tension for the beginning turns than for the later turns.

2. An aluminum electrolytic capacitor device according to claim 1, wherein said cylindrical hole of the rolled device has a diameter as great as 7 mm or greater.

3. An aluminum electrolytic capacitor device comprising:
   an anode foil:
   a cathode foil;
   an electrolyte-containing paper provided between said anode foil and said cathode foil; and
   a rolled device cylindrically formed by rolling said anode foil, said cathode foil and said electrolyte-containing paper, wherein said rolled device has a cylindrical hole formed in a core portion thereof and has a portion adjacent to the cylindrical hole;
   the portion adjacent to the cylindrical hole is formed of said cathode foil and said electrolyte-containing paper exclusive of said anode foil; and
   the portion adjacent to the cylindrical hole is between a first diameter position of the cylindrical hole and a second diameter larger than the first diameter so as to prevent a short circuit between said anode foil and said cathode foil caused by abnormal stress.

4. An aluminum electrolytic capacitor device according to claim 3, wherein said core-adjacent portion, including said core portion, has a diameter as great as 7 mm or greater.

5. An aluminum electrolytic capacitor device according to claim 3, which is used as a smoothing capacitor connected between the output side of a rectifier and the input side of a switching circuit of a switching power circuit which is connected to a single-phase three-wire input power source.

* * * * *

UNITED STATES PATENT AND TRADEMARK OFFICE
CERTIFICATE OF CORRECTION

PATENT NO. : 5,448,448
DATED : September 5, 1995
INVENTOR(S) : YOSHICHIKA FUJIWARA, ET AL.

It is certified that error appears in the above-indentified patent and that said Letters Patent is hereby corrected as shown below:

ON TITLE PAGE

In [56] References Cited, insert:

-- FOREIGN PATENT DOCUMENTS

| | | |
|---|---|---|
| 1100707 | 1/1968 | United Kingdom |
| 1-155612 | 6/1989 | Japan |
| 1-283063 | 11/1989 | Japan |
| 3-296207 | 12/1991 | Japan --. |

COLUMN 4

Line 42, "foil; and" should read --foil;--.
Line 50, "paper" should read --paper,--.

Signed and Sealed this

Sixteenth Day of January, 1996

Attest:

BRUCE LEHMAN

Attesting Officer     Commissioner of Patents and Trademarks